United States Patent
Hakkaku (10) Patent No.: US 11,318,681 B2
(45) Date of Patent: May 3, 2022

(54) FORMING APPARATUS FOR FORMING THREE-DIMENSIONAL STRUCTURE

(71) Applicant: MIMAKI ENGINEERING CO., LTD., Nagano (JP)

(72) Inventor: Kunio Hakkaku, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/533,750

(22) Filed: Aug. 6, 2019

(65) Prior Publication Data
US 2019/0358864 A1    Nov. 28, 2019

Related U.S. Application Data (63) Continuation of application No. 15/312,184, filed as application No. PCT/JP2015/064312 on May 19, 2015, now Pat. No. 10,427,333.

(30) Foreign Application Priority Data

May 21, 2014  (JP) ................. 2014-105654

(51) Int. Cl.
| | |
|---|---|
| *B29C 64/112* | (2017.01) |
| *B29C 64/393* | (2017.01) |
| *B29C 64/386* | (2017.01) |
| *B33Y 30/00* | (2015.01) |
| *B33Y 40/00* | (2020.01) |
| *B29C 37/00* | (2006.01) |
| *B33Y 50/02* | (2015.01) |

(52) U.S. Cl.
CPC ........ *B29C 64/393* (2017.08); *B29C 37/0025* (2013.01); *B29C 64/112* (2017.08); *B33Y 30/00* (2014.12); *B33Y 40/00* (2014.12); *B33Y 50/02* (2014.12)

(58) Field of Classification Search
CPC ....... B29C 64/00; B29C 64/20; B29C 64/112; B29C 64/205; B29C 64/209; B29C 64/393; B29C 64/386; B29C 37/0025; B33Y 10/00; B33Y 30/00; B33Y 40/00; B33Y 50/02
See application file for complete search history.

(56) References Cited

U.S. PATENT DOCUMENTS

| | | | | |
|---|---|---|---|---|
| 6,200,646 B1 * | 3/2001 | Neckers | ................ | B29C 64/129 427/510 |
| 6,612,824 B2 * | 9/2003 | Tochimoto | .............. | B29C 41/36 425/130 |
| 6,652,256 B2 * | 11/2003 | Coe | ........................ | B33Y 30/00 425/130 |
| 7,225,045 B2 * | 5/2007 | Gothait | .................. | B33Y 70/00 700/119 |

(Continued)

Primary Examiner — Joseph S Del Sole
Assistant Examiner — Baileigh Kate Darnell
(74) Attorney, Agent, or Firm — JCIPRNET (57) ABSTRACT

A forming apparatus having a degree of freedom in shaping for forming a three-dimensional structure is provided. A forming apparatus (30) forms a three-dimensional structure (5), which includes a shaped article and a colored portion that colors a surface of the shaped article, by laminating layers, and it can switch between a first operation mode dedicated to shaping the shaped article and a second operation mode of full-color coloring the surface of the shaped article using full colors simultaneously as the shaping of the shaped article.

7 Claims, 6 Drawing Sheets

(56) References Cited

U.S. PATENT DOCUMENTS

| | | | | |
|---|---|---|---|---|
| 7,300,619 B2* | 11/2007 | Napadensky | ........... | B29C 64/10 |
| | | | | 264/401 |
| 7,369,915 B2* | 5/2008 | Kritchman | .............. | B29C 41/48 |
| | | | | 700/118 |
| 2002/0167101 A1* | 11/2002 | Tochimoto | .............. | B29C 41/36 |
| | | | | 264/40.1 |
| 2004/0175451 A1* | 9/2004 | Maekawa | ................ | B29C 41/36 |
| | | | | 425/144 |
| 2004/0187714 A1* | 9/2004 | Napadensky | ........... | B29C 64/10 |
| | | | | 101/35 |
| 2010/0191360 A1* | 7/2010 | Napadensky | ........... | G06T 17/00 |
| | | | | 700/98 |
| 2010/0195122 A1* | 8/2010 | Kritchman | ............. | B33Y 50/00 |
| | | | | 358/1.9 |
| 2013/0073068 A1* | 3/2013 | Napadensky | ........... | G06T 17/00 |
| | | | | 700/98 |
| 2014/0203479 A1* | 7/2014 | Teken | .................... | B33Y 10/00 |
| | | | | 264/401 |
| 2015/0210010 A1* | 7/2015 | Napadensky | ........... | G06T 17/00 |
| | | | | 428/195.1 |
| 2016/0001505 A1* | 1/2016 | Hakkaku | ................ | B41J 3/4073 |
| | | | | 264/255 |

\* cited by examiner

FORMING APPARATUS FOR FORMING THREE-DIMENSIONAL STRUCTURE

CROSS-REFERENCE TO RELATED APPLICATION

This application is a continuation application of and claims priority benefit of a U.S. application Ser. No. 15/312,184, filed on Nov. 18, 2016, now allowed, which also is a 371 application of international application of PCT application serial no. PCT/JP2015/064312, filed on May 19, 2015, which claims the priority benefit of Japan application No. 2014-105654, filed on May 21, 2014. The entirety of the above-mentioned patent applications is hereby incorporated by reference herein and made a part of this specification.

TECHNICAL FIELD

The disclosure relates to a forming apparatus for forming a three-dimensional structure, and more specifically relates to a forming apparatus for forming a three-dimensional structure by depositing ink to form a layer and laminating such layers.

BACKGROUND ART

Aside from a sheet laminating method as described in Patent Literature 1, there are known techniques to mold a three-dimensional object using a fused deposition (FDM: Fused Deposition Modeling) method, an inkjet method, an inkjet binder method, a photolithography (SL: Stereo Lithography) method, a powder sintering (SLS: Selective Laser Sintering) method, and the like.

Among such, a method of jetting ultraviolet curing resin by a 3D printer to laminate patterns is used frequently as the inkjet method. This method creates data of a design or mechanism and the like of outer and inner appearances of a final product by 3D-CAD, thereafter generates a multi-layered pattern data that overlaps thin films by slicing the data by a computer, and molds a three-dimensional object by jetting ultraviolet curing resin from a head according to the pattern data and laminating such layers.

CITATION LIST

Patent Literature 1: Unexamined Japanese Patent Publication No. 2001-18297 (published on Jul. 9, 1999)

SUMMARY OF DISCLOSURE

Technical Problem

The inventor of the present application completed an disclosure that forms a color-decorated three-dimensional structure by a laminating method by discharging shaping ink and decorative ink (such as ink colored with yellow, magenta, cyan, or black) using an inkjet method, and filed a patent application therefor prior to the filing of the present application (the application as aforementioned is not published at the time of filing the present application).

Further, the inventor of the present application has further considered improvements from the aspect of giving a greater degree of freedom to the shaping (shaping), which has resulted in a new forming apparatus for a three-dimensional structure, leading to the completion of the disclosure.

That is, the disclosure aims to provide a forming apparatus for forming a three-dimensional structure having a degree of freedom in shaping.

Solution to the Problem

To provide a solution to the above problem, a three-dimensional structure forming apparatus of the disclosure is a three-dimensional structure forming apparatus for forming a three-dimensional structure by laminating layers, the three-dimensional structure including a shaped article and a colored portion that colors a surface of the shaped article, the forming apparatus including: a first operation mode dedicated to shaping the shaped article; a second operation mode of coloring the surface of the shaped article using full colors according to input data simultaneously as the shaping of the shaped article; and a switching section configured to switch between the first operation mode and the second operation mode.

According to this configuration, by being provided with the switching section, the operation modes can be switched between a case where a user desires to perform only the shaping and a case where the user desires a three-dimensional structure further having the surface of its shaped article colored.

Further, for example, an ink resolution to be used in the full-colored coloring is generally higher (finer) than an ink resolution used in the shaping, thus, in a case of the first operation mode in which the shaping simply needs to be performed without giving any consideration to color tones, the shaping can be performed using the ink resolution lower (coarser) than the ink resolution used in the full-colored coloring. In this case, an effect can be achieved in that the shaped article can rapidly be formed when the first operation mode is selected.

Further, in addition to the above configuration, an aspect of the three-dimensional structure forming apparatus according to the disclosure may further include an inkjet head, where the layers formed by discharging a shaping material for the shaping and a coloring material for the coloring from the inkjet head are laminated.

Further, in an aspect of the three-dimensional structure forming apparatus according to the disclosure, in addition to the above configuration, scanning for forming plural colored layers may be performed within a scan cycle time period for forming one layer in the shaping.

According to this configuration, the ink resolution of the fully-colored portion becomes finer than the shaped portion where the color tones do not have to be considered. Due to this, the colors in half-tones can satisfactorily be exhibited in the fully-colored portion.

Further, in an aspect of the three-dimensional structure forming apparatus according to the disclosure, in addition to the above configuration, scanning for forming plural clear protection layers may be performed within a scan cycle time period for forming one layer in the shaping.

According to this configuration, a surface roughness of the clear protection layers can be reduced, and glossiness can be achieved.

Further, in an aspect of the three-dimensional structure forming apparatus according to the disclosure, in addition to the above configuration, the shaping material and the coloring material may be ultraviolet curing ink.

According to this configuration, by using the ultraviolet curing ink as the shaping material and the coloring material, the ink can be cured for a short period of time, thus the lamination thereof is easy, and the three-dimensional structure can be formed for a shorter period of time.

Further, an aspect of the three-dimensional structure forming apparatus according to the disclosure may further include, in addition to the aforementioned configuration: a first inkjet head nozzle section configured to discharge the shaping material; a second inkjet head nozzle section configured to discharge the coloring material; and a plurality of irradiators including light sources for curing the ink, where the plurality of irradiators is respectively arranged at positions with each of the first inkjet head nozzle section and the second inkjet head nozzle section interposed in between along a scanning direction.

According to this configuration, since an irradiation section is provided at each of the positions having the first inkjet head nozzle section and the second inkjet head nozzle section interposed in between along the scanning direction, the ink that has been dripped can efficiently be cured.

Effects of the Disclosure

According to the disclosure, due to being able to select the modes, a three-dimensional structure forming apparatus having the degree of freedom in the shaping (shaping) can be provided.

EMBODIMENTS OF THE DISCLOSURE

An embodiment of a three-dimensional structure forming apparatus according to the disclosure will be described hereinbelow.

It should be noted that in regards to terminology "three-dimensional structure" used in the description herein, it is defined as meaning a three-dimensional object including a shaped article, and a colored portion where a surface of the shaped article is colored.

(1) Three-Dimensional Structure Forming Apparatus

Figure 1:
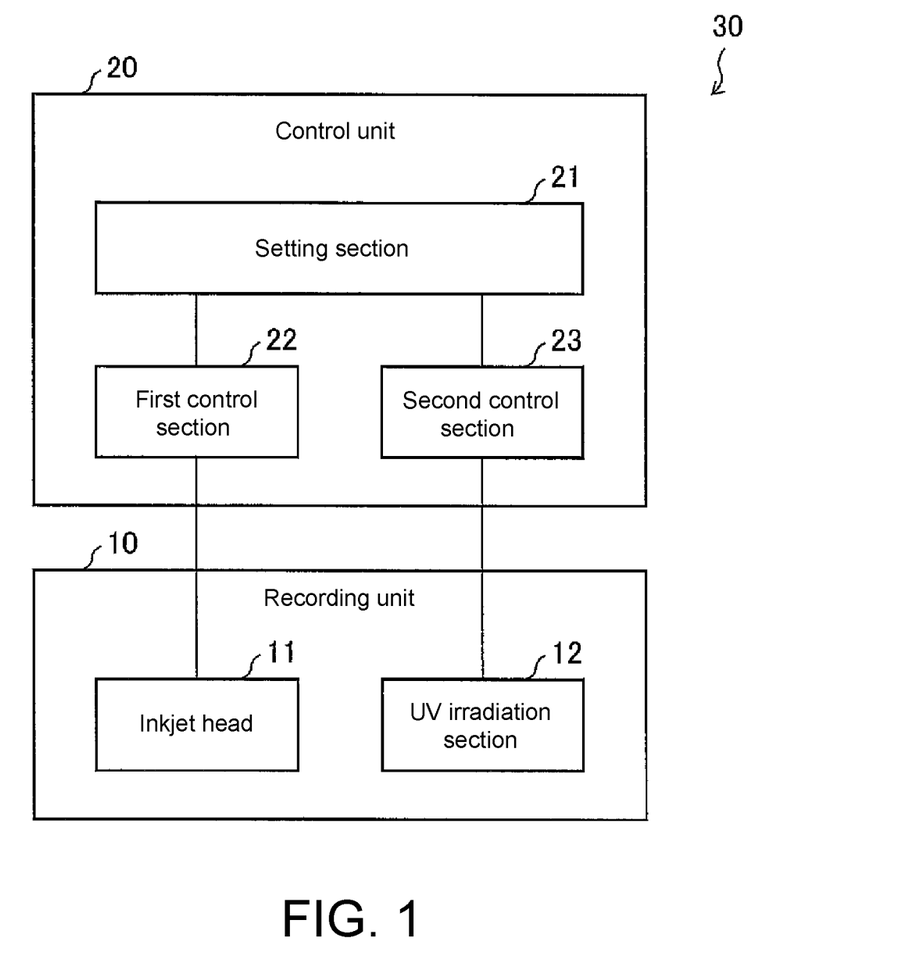
FIG. 1 is a block diagram illustrating a primary configuration of an embodiment of a forming apparatus according to the disclosure.

FIG. 1 is a block diagram illustrating a primary configuration of a three-dimensional structure forming apparatus of the present embodiment (hereinbelow denoted as a forming apparatus).

A forming apparatus 30 of the present embodiment is an apparatus for forming a three-dimensional structure, which includes a shaped article, and a colored portion where a surface of the shaped article is colored, by laminating layers. Due to this, as illustrated in FIG. 1, the forming apparatus 30 of the present embodiment includes a recording unit (recording device) 10, and a control unit 20 (controller) (switching section). The recording unit 10 is a unit for performing shaping and coloring, and the control unit 20 controls those shaping and coloring. Each configuration will be described in detail below.

Recording Unit 10

Figure 2:
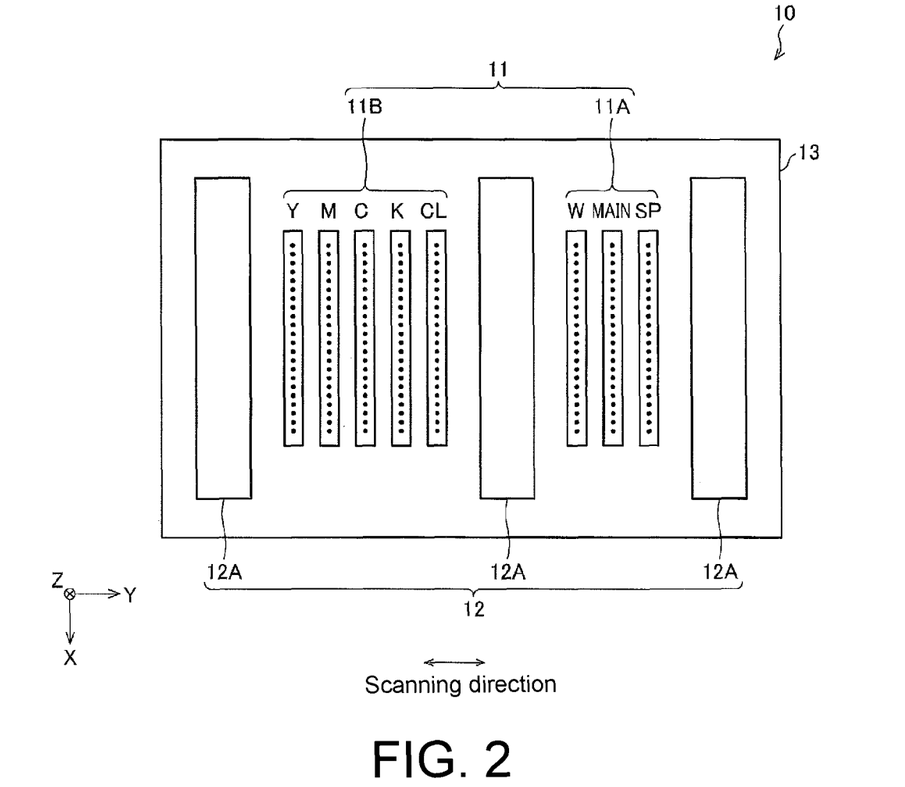
FIG. 2 is a diagram illustrating a lower surface of a recording unit, which is a part of the forming apparatus illustrated in FIG. 1.

FIG. 2 illustrates a specific configuration of the recording unit 10. FIG. 2 illustrates an ink discharging surface (lower surface) of the recording unit 10.

The recording unit 10 includes a carriage 13, an inkjet head 11, and a UV irradiation section 12.

The carriage 13 is configured to reciprocate along a Y axis, and is mounted with the inkjet head 11 and the UV irradiation section 12.

The inkjet head 11 discharges ink using an inkjet method. Ultraviolet curing ink may be used as the ink to be discharged. By using the ultraviolet curing ink, layer lamination is easy due to a short period of time required for curing, and there is an advantage of being able to manufacture a three-dimensional structure in a shorter period of time. The ultraviolet curing ink includes ultraviolet curing compositions. As such ultraviolet curing compositions, there is no limitation so long as they are compositions that are cured when being irradiated with ultraviolet light. As the ultraviolet curing compositions, for example, curing monomers and curing oligomers that are polymerized by the ultraviolet light irradiation may be exemplified. As such curing monomers, for example, low-viscosity acrylic monomers, vinyl ethers, oxetane-containing monomers, cyclic aliphatic epoxy monomers, and the like may be exemplified. As such curing oligomers, for example, acrylic oligomers may be exemplified. It should be noted that the disclosure is not limited to ultraviolet curing ink, but may for example use thermoplastic ink. When thermoplastic ink is used, the heated ink that has been discharged cures by being cooled. At this occasion, forced cooling may be employed to shorten the curing.

As illustrated in FIG. 2, the inkjet head 11 includes a first inkjet head nozzle section (first nozzle row group) 11A that discharges a shaping material, and a second inkjet head nozzle section (second nozzle row group) 11B that discharges a coloring material.

The first inkjet head nozzle section 11A discharges ink being the shaping material for shaping the shaped article, which is a part of the three-dimensional structure 5 (hereinbelow referred also as "shaping ink"), and ink of a support material that supports lamination of an over-hanging portion by surrounding a periphery of the shaped article. In the present embodiment, clear ink and white ink are used as the shaping material. Due to this, the first inkjet head nozzle section 11A includes a support ink nozzle row SP for discharging the ink of the support material (hereinbelow referred also as "support ink"), a shaping ink nozzle row MAIN for discharging shaping ink, and a white ink nozzle row W for discharging the white ink. Well-known shaping ink may be used as the shaping ink; however, white ink or clear ink as will be described later may be used.

The second inkjet head nozzle section 11B discharges ink being the coloring material for forming the colored portion that is a part of the three-dimensional structure 5. In the present embodiment, yellow ink, magenta ink, cyan ink, black ink, and clear ink are used as the coloring material. Due to this, the second inkjet head nozzle section 11B is provided with a yellow ink nozzle row Y for discharging the yellow ink, a magenta ink nozzle row M for discharging the magenta ink, a cyan ink nozzle row C for discharging the cyan ink, a black ink nozzle row K for discharging the black ink, and a clear ink nozzle row CL for discharging the clear ink.

A plurality of nozzle rows arranged in the first inkjet head nozzle section 11A and a plurality of nozzle rows arranged in the second inkjet head nozzle section 11B are arranged along a scanning direction of the recording unit 10 (Y axis direction). That is, as illustrated in FIG. 2, the yellow ink nozzle row Y, the magenta ink nozzle row M, the cyan ink nozzle row C, the black ink nozzle row K, the clear ink nozzle row CL, the white ink nozzle row W, the shaping ink nozzle row MAIN, and the support ink nozzle row SP are arranged in this order along the Y axis direction. Since the recording unit 10 mounts each of these plurality of nozzle rows on the carriage 13, it is configured capable of discharging (dripping) the ultraviolet curing ink from the pluralities of nozzle rows in a Z axis direction during its movement in the Y direction accompanying the movement of the carriage 13.

It should be noted that each nozzle row has a plurality of nozzle holes arranged along an X axis direction.

It should be noted that arrangement orders and numbers of the nozzle rows are not limited to those illustrated in FIG. 2. For example, since the shaping ink nozzle row MAIN and the support ink nozzle row SP have greater discharge amounts as compared to others, thus plural rows may be provided for each of them, or they may be configured with higher density by increasing a total number of nozzle holes per nozzle row. As a result, the first operation mode dedicated to shaping can be performed at fast speed. Further, the white ink nozzle row W for enabling subtractive color mixing may be provided in the second inkjet head nozzle section 11B.

The UV irradiation section 12 includes a plurality of irradiators 12A including light sources for curing the ink, and it is mounted on the carriage 13. Specifically, the UV irradiation section 12 includes three irradiators 12A arranged along the Y axis direction, and the three irradiators 12A are arranged by having the first inkjet head nozzle section 11A and the second inkjet head nozzle section 11B interposed in between them. That is, the carriage 13 has the irradiator 12A, the first inkjet head nozzle section 11A, the irradiator 12A, the second inkjet head nozzle section 11B, and the irradiator 12A in this order along the Y axis direction. As above, since all of the nozzle rows are arranged by being aligned in the Y axis direction, a layer formation by discharging entire ink for one layer by one movement in the Y axis direction is possible, and since ultraviolet light irradiation is performed at the same time as the ink discharge in this one movement in the Y axis direction, the curing for one layer in the case of the ultraviolet curing ink can be performed at the same timing as the discharging.

It should be noted that all of the three irradiators 12A configuring the UV irradiation section 12 have at least an irradiation intensity that can cure small ink droplets for forming the colored portion to be described later during the movement in the Y axis direction. The three irradiators 12A may have the same irradiation intensity, or may have different irradiation intensity.

Further, in a case where all of the three irradiators 12A have only the irradiation intensity that can cure the small ink droplets to be described later, and has only the irradiation intensity that cannot cure large ink droplets to be described later in the one movement in the Y axis direction, the large ink droplets may be semi-cured by the irradiators 12A. In this configuration, the shape of the shaped article can be adjusted during the semi-cured state, and its complete curing may be performed after the adjustment.

Control Unit 20

The control unit 20 is provided to control the recording unit 10. A characteristic feature of the forming apparatus 30 in the present embodiment lies in that the operation mode can be switched between a first operation mode dedicated to the shaping of the shaped article and a second operation mode in which a surface of the shaped article is colored using full colors based on input data simultaneously as the shaping of the shaped article, by this control unit 20 controlling the recording unit 10.

As illustrated in FIG. 1, the control unit 20 includes a setting section 21 (switching section), a first control section 22, and a second control section 23.

The setting section 21 is provided for various settings and input operations. The setting (switching) of the aforementioned operation modes can be set by a user from the setting section 21. The setting section 21 generates information indicating set contents and input contents, and the generated information can be output to the first control section 22 and the second control section 23.

The first control section 22 controls the discharge of the respective types of ink from the inkjet head 11 of the recording unit 10 based on the information acquired from the setting section 21. Specific control contents will be described later.

Further, the first control section 22 may be provided with a memory section that is not shown, and this memory section may store shape data of the three-dimensional structure (including input data for forming the colored portion). Specifically, after having created data using 3D-CAD of a design or mechanism and the like of outer and inner appearances of a final product, the memory section may store multi-layered pattern data in which thin films are overlapped by slicing the data by a computer. It should be noted that the shape data of the three-dimensional structure may be acquired from outside the first control section 22, or may be generated by the first control section 22 based on information acquired from outside the first control section 22.

The second control section 23 is provided to control irradiation of the UV irradiation section 12 in the recording unit 10.

It should be noted that the control unit 20 is provided with a control section (not shown) that controls movement of the carriage 13.

(2) Operation of Forming Apparatus (Forming Method of Three-Dimensional Structure)

In the present embodiment, the first operation mode dedicated to the shaping of a shaped article and the second operation mode of coloring the surface of the shaped article using fill colors based on the input data simultaneously as the shaping of the shaped article can be switched. Moreover, a characteristic feature of the present embodiment lies in that scanning for forming plural colored layers is performed using the aforementioned forming apparatus 30 during a scan cycle time period for forming one layer in the shaping.

Hereinbelow, the details of the forming method to be performed using the forming apparatus 30 will be described; however, firstly the configuration of the three-dimensional structure 5 to be formed will be described.

(2-1) Configuration of Three-Dimensional Structure

Figure 3:
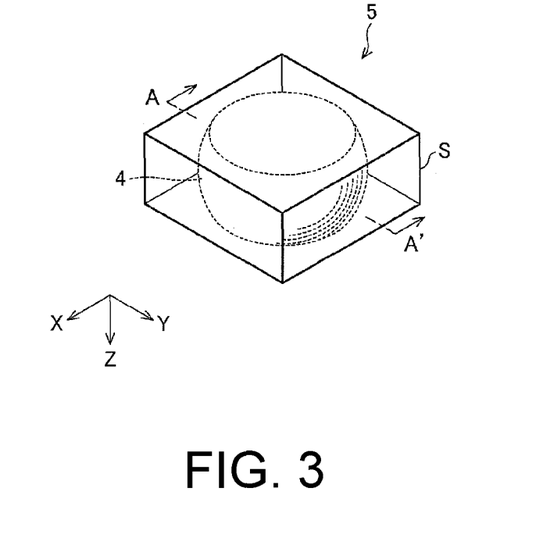
FIG. 3 is a perspective diagram of a three-dimensional structure formed by the forming apparatus illustrated in FIG. 1.
Figure 4:
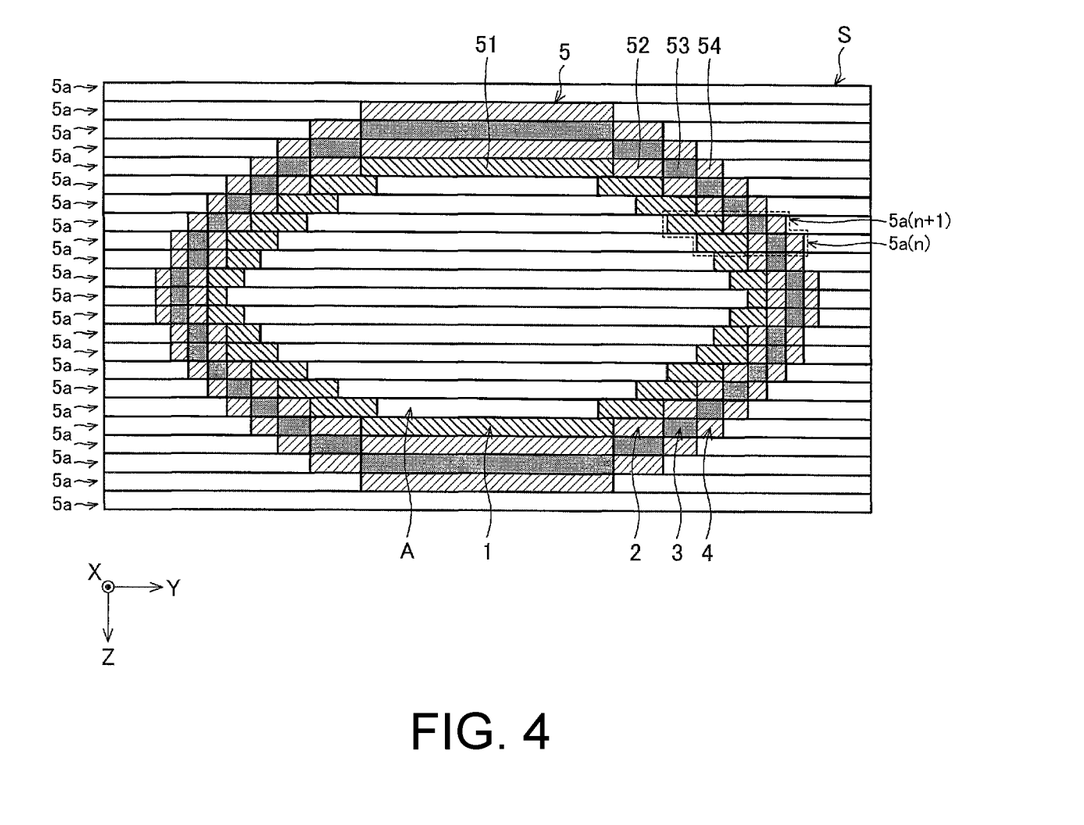
FIG. 4 is a cross sectional diagram of the three-dimensional structure illustrated in FIG. 3.

FIG. 3 is a diagram of an outer appearance of the three-dimensional structure 5 formed by using the forming apparatus 30 of the present embodiment, and FIG. 4 is an arrow-view cross sectional diagram of the three-dimensional structure 5 along a sectional line A-A' in FIG. 3.

The three-dimensional structure 5 has a substantially columnar outer shape, and it is constituted of an upper surface and a lower surface configured of flat surfaces, and a side surface that is curved so that its diameter becomes larger from the upper and lower surfaces towards a center in a height direction. It should be noted that the shape of the three-dimensional structure is not limited to the one illustrated in FIG. 3, but may be adapted to various shapes, such as a hexahedron described below, a sphere, a hollow structure, a ring structure, or a horseshoe shape, for example. Further, an outer side of the three-dimensional structure 5 is covered by a support layer S that enables the shaping of over-hanged structures.

The three-dimensional structure 5 is formed of a second clear layer 4, a colored layer 3 formed by ink containing colorants (colored ink), a first clear layer 2 (FIG. 4) formed by the clear ink, a white layer 1 (FIG. 4) formed of the white ink having a light reflectivity, and a shaping layer A configuring a shaped body portion in this order, from its surface layer side (outer peripheral side) toward its inner side (center portion side). That is, in the three-dimensional structure 5, the shaping layer A positioned at the center portion is coated by the white layer 1, the first clear layer 2, the colored layer 3, and the second clear layer 4 in this order.

It should be noted that in the present embodiment, although the shaping layer A and the white layer 1 will be regarded as the shaped article, only the shaping layer A may configure the shaped article, or the shaped article may be configured only by the white layer 1 without providing the shaping layer A. Further, a hollow may be provided in the shaped article.

The shaping layer A, the white layer 1, the first clear layer 2, the colored layer 3, the second clear layer 4, and the support layer S are each formed by depositing ink using the inkjet method. It should be noted that the support ink for the support layer S is water soluble, and it can be dissolved and removed by water after the shaping to take out the three-dimensional structure 5.

The cross section of the three-dimensional structure 5 illustrated in FIG. 4 exposes a cross section along a YZ plane at a central position of the three-dimensional structure 5 in an XYZ coordinate system illustrated in FIG. 3.

As illustrated in FIG. 4, the three-dimensional structure 5 is a structure that is formed by a laminate method that laminates a plurality of layers 5a . . . using the inkjet method. It should be noted that the drawings illustrate the coordinate system in which an axis along the laminate direction is the Z axis. In this coordinate system, each of the layers 5a . . . expands along the XY plane. It should be noted that in FIG. 4, although twenty-one layers are laminated therein, a total number of layers to be laminated does not have any limitation.

Each of the layers 5a . . . obtained by slicing the three-dimensional structure 5, in which the shaping layer A is coated by the white layer 1, the first clear layer 2, the colored layer 3, and the second clear layer 4 in this order from the shaping layer A located at the center portion toward the surface layer side, as described above, in plural layers along the Z axis direction as in FIG. 4, includes a part of the shaping layer A (hereinbelow referred to as a shaping layer portion 50), a part of the white layer 1 (hereinbelow referred to as a while layer portion 51), a part of the first clear layer 2 (hereinbelow referred to as a first clear layer portion 52), a part of the colored layer 3 (hereinbelow referred to as a colored layer portion 53), or a part of the second clear layer 4 (hereinbelow referred to as a second clear layer portion 54), according to its laminated position.

Figure 5:
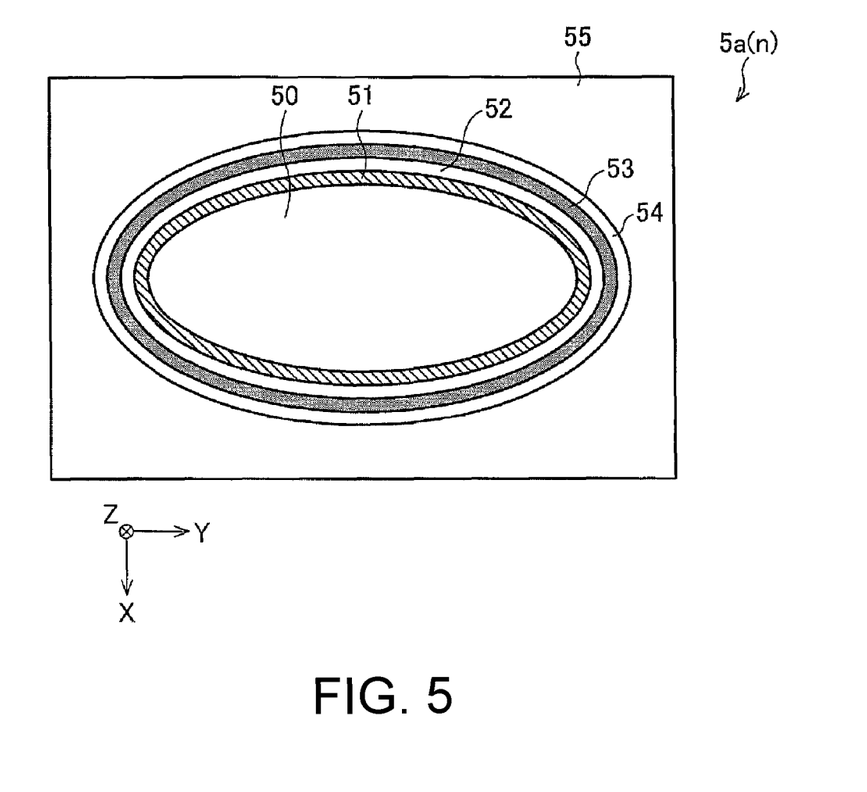
FIG. 5 is a planar diagram of one of a plurality of layers configuring the three-dimensional structure illustrated in FIG. 3.

Specifically, as illustrated in FIG. 4, among the plurality of layers 5a configuring the three-dimensional structure 5, the layer 5a located at a lowermost position and the layer 5a located at a topmost position are layers 5a consisting only of the second clear layer portions 54. Further, on opposing sides (inner sides) of these layers 5a, layers 5a in each of which the second clear layer portions 54 are formed on an outer periphery of the colored layer portion 53 are respectively arranged. On the further inner sides thereof, layers 5a in each of which the second clear layer portions 54, colored layer portions 53, and the first clear layer portion 52 are formed in this order from its outer peripheral edges towards the center are arranged. On the further inner sides thereof, layers 5a in each of which the second clear layer portions 54, the colored layer portions 53, the first clear layer portions 52, and the white layer portion 51 are formed in this order from its outer peripheral edges towards the center are arranged. Further, in an intermediate region that is interposed between them, layers 5a (in FIG. 4, layers 5a(n) and 5a(n+1) are illustrated) in each of which the second clear layer portions 54, the colored layer portions 53, the first clear layer portions 52, the white layer portions 51, and the shaping layer portions 50 are formed in this order from its outer peripheral edges towards the center are arranged. FIG. 5 shows a planar diagram (XY plane diagram) of the layers 5a having the second clear layer portions 54, the colored layer portions 53, the first clear layer portions 52, the white layer portions 51, and the shaping layer portions 50 formed in this order from their outer peripheral edges towards the center.

It should be noted that a number of arrangement of the respective types of layers is not limited to the one illustrated in FIG. 4. Further, the configuration of the respective layers 5a . . . is not limited to the one described above so long as the three-dimensional structure 5 illustrated in FIG. 4 is formed by the laminating method.

As illustrated in FIG. 4, by having the plurality of layers 5a . . . laminated in the Z axis direction, the second clear layer portions 54 of the respective layers 5a . . . become continuous substantially along an outermost peripheral surface direction of the three-dimensional structure 5, and form the second clear layer 4 thereby. Further, the colored layer portions 53 of the respective layers 5a . . . that include the colored layer portions 53 become continuous substantially along the outermost peripheral surface direction of the three-dimensional structure 5, and form the colored layer 3 thereby. Further, the first clear layer portions 52 of the respective layers 5a . . . that include the first clear layer portions 52 become continuous substantially along the outermost peripheral surface direction of the three-dimensional structure 5, and form the first clear layer 2 thereby. Further, the white layer portions 51 of the respective layers 5a . . . that include the white layer portions 51 become continuous substantially along the outermost peripheral surface direction of the three-dimensional structure 5, and form the white layer 1 thereby. Further, the shaping layer portions 50 of the respective layers 5a . . . including the shaping layer portions 50 are laminated to form the shaping layer A.

By arranging as above, the three-dimensional structure 5 having the desired color tone as seen from every direction can be achieved.

Here, in the present embodiment, the surface layer side (outer peripheral side) to the second clear layer 4, the colored layer 3, and the first clear layer 2 within the three-dimensional structure 5 illustrated in FIGS. 3 and 4 correspond to the "colored portion". Further, the white layer 1 and the shaping layer A on the inner side thereof correspond to the "shaped article". That is, the shaped article refers to the configuration in which the first clear layer 2, the colored layer 3, and the second clear layer 4 are excluded from the three-dimensional structure 5 illustrated in FIGS. 3 and 4. Thus, the shaped article uses a region including the shaping layer portions 50 and the white layer portions 51 among the aforementioned various layers 5a as its layers, and can be shaped by laminating these layers. Further, the three-dimensional structure 5 may be shaped only by the shaping layer portions 50, or may be shaped by the shaping layer portions 50 and the second clear layer 4.

That is, the forming apparatus 30 of the present embodiment can complete an aimed object (shaped article, three-dimensional structure) by using the inkjet method to laminate the layers in both the case of shaping the shaped article and the case of forming the three-dimensional structure 5 illustrated in FIGS. 3 and 4.

It should be noted that if the colored layer 3 is included in the "colored portion" and the shaping layer A is included in the "shaped article", the first clear layer 2 and the white layer 1 interposed in between them may be included in either the "colored portion" or the "shaped article". However, in order to enable coloring using the subtractive color mixing in the colored layer 3, the presence of the white layer 1 is necessary.

(2-2) As to Operation Modes

In the present embodiment, a first operation mode in which the forming apparatus 30 shapes only the shaped article, and a second operation mode of forming the three-dimensional structure 5 by forming the colored portion as illustrated in FIG. 4 simultaneously as the shaping of the shaped article are provided. The three-dimensional structure 5 in which the colored portion is formed simultaneously as the shaping of the shaped article by laminating the various layers 5a illustrated in FIGS. 3 and 4 is the aimed object achieved by having operated the forming apparatus 30 in the second operation mode. On the other hand, the shaped article is shaped by laminating the portions including the shaping layer portions 50 and the white layer portions 51 in each of the layers 5a illustrated in FIG. 4. This shaped article is the aimed object achieved by having operated the forming apparatus 30 in the first operation mode. It should be noted that in the case of shaping only the shaped article, layers having only the white layer portions 51 are arranged (laminated) at the topmost position and the lowermost position.

Further, in the present embodiment, the user can switch between these operation modes by the setting section 21 of the control unit 20. Due to this, the operation modes can be switched between the case where only the shaping of the shaped article is desired (by a user) and the case where the three-dimensional structure to which the coloring on the surface of the shaped article is also performed is desired.

Further, another advantage achieved by the forming apparatus 30 capable of switching the modes as above is that the shaped article can quickly be shaped (provided) when the first operation mode is selected. This will be clarified in the course of explaining the forming method using the forming apparatus 30.

(2-3) Second Operation Mode

Figure 6:
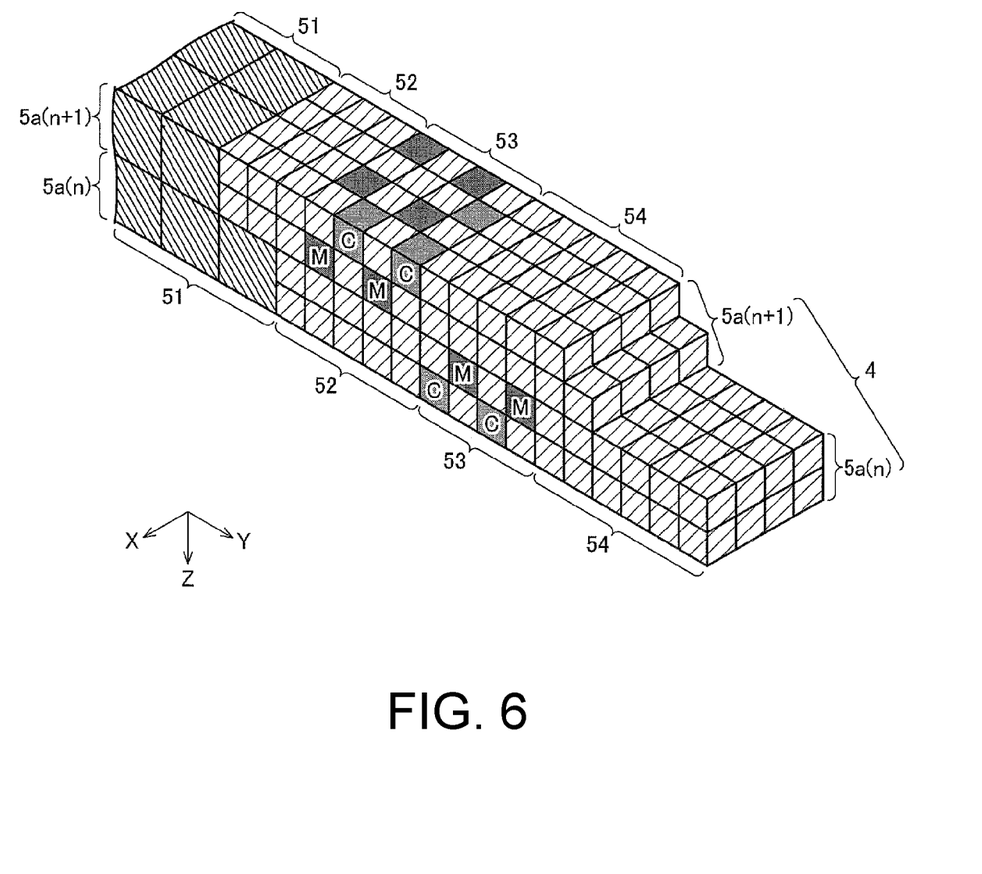
FIG. 6 is a diagram schematically illustrating a part of the three-dimensional structure formed by the forming apparatus illustrated in FIG. 1.

FIG. 6 is a partial cross sectional diagram illustrating details in a vicinity of the layers $5a(n)$ and $5a(n+1)$ illustrated in FIG. 4. In FIG. 6, one droplet of ink discharged from the inkjet nozzle in each of the layers $5a(n)$ and $5a(n+1)$ is indicated schematically as one block cell. It should be noted that since the layers $5a(n)$ and $5a(n+1)$ illustrated in FIG. 6 indicate only the region surrounded by a broken line in FIG. 4 for the convenience of explanation, the shaping layer portions 50 and the support layer portions 55 are not illustrated. Right ends relative to the sheet surface for the layers $5a(n)$ and $5a(n+1)$ illustrated in FIG. 6 are a part of an outermost surface of the second clear layer 4 configured by consecutive side surfaces at outer circumferential ends of the layers, meaning that they are a part of a side surface of the three-dimensional structure 5. Further, the colored portion layer portions 53 of FIG. 6 are configured of three types of ink, namely cyan, magenta, and clear, and thus the surface of the three-dimensional structure 5 is, macroscopically, light-blue colored.

Another characteristic feature of the forming method of the present embodiment lies in that a size of each droplet of ink discharged from the inkjet for forming the white layer portions 51 is larger than a size of each droplet of ink discharged from the inkjet nozzle for forming the first clear layer portions 52, the colored layer portions 53, and the second clear layer portions 54 as illustrated in FIG. 6. FIG. 6 is schematic illustration and is merely an example; however, a volume of each droplet of ink for forming the white layer portions 51 is eight times a volume of each droplet of ink for forming the first clear layer portions 52, the colored layer portions 53, and the second clear layer portions 54.

As a method to provide a difference in the size, there is a method to enlarge the ink droplets discharged from the inkjet nozzles for forming the white layer portions 51 than the ink droplets discharged from the inkjet nozzles for forming the first clear layer portions 52, the colored layer portions 53, and the second clear layer portions 54. That is, this method forms a size difference illustrated in FIG. 6 in the sizes of the ink droplets at the time of being discharged from the inkjet nozzles.

However, the disclosure is not limited hereto, and there is a method in which the size of the ink droplets discharged from the inkjet nozzles may be uniform for all of the white layer portions 51, the first clear layer portions 52, the colored layer portions 53, and the second clear layer portions 54, and a number of discharge per unit time for the white ink for forming the white layer portions 51 may be set greater than a number of discharge per unit time for each ink for forming the first clear layer portions 52, the colored layer portions 53, and the second clear layer portions 54. By using this method, the white ink for forming the white layer portions 51 is consecutively discharged from the nozzles and the ink droplets mix with each other before they strike onto the surface, or be deposited by being mixed upon the striking to form a large-sized ink droplet. The number of discharge per unit time can be facilitated by controlling the ink discharge timing.

The size difference illustrated in FIG. 6 of the ink droplets is facilitated by the control unit 20 controlling the recording unit 10 in the forming apparatus 30 illustrated in FIG. 3.

Further, the difference in the volume per one droplet of ink was explained as being 8 times; however, a relationship between the white layer portions 51 and the first clear layer portions 52, and the like illustrated in FIG. 6 may be interpreted as that two layers of the first clear layer portions 52, and the like are being formed for each layer of the white layer portions 51. This can be facilitated by performing scanning for forming two colored layers during each scan cycle time period for forming one layer in the shaping in the forming apparatus 30 that operates under the second operation mode.

That is, to explain a process to form the layer 5a(n) illustrated in FIG. 6, the recording unit 10 illustrated in FIG. 2 is moved (scan) in the Y axis direction to discharge the large ink droplets of the white ink to form the white layer portions 51, and one layer is thereby formed. At this occasion, the ink is cured using the irradiator 12A close to the white ink nozzle row W in the UV irradiation section 12 illustrated in FIG. 2. Then, at the same time as forming the one layer by discharging the white ink for forming the white layer portions 51 in large droplets, another layer is formed by the clear ink and the colored ink in small droplets. The small ink droplets form the lower half of each of the first clear layer portions 52, the colored layer portions 53, and the second clear layer portions 54 in the layer 5a(n) of FIG. 6. At this occasion, the ink is cured by using the irradiator 12A close to the nozzle row discharging the clear ink and the colored ink.

Then, the recording unit 10 illustrated in FIG. 2 is moved (scan) in the Y axis direction to form another layer using the clear ink and the colored ink in small droplets on top of the deposited clear ink and colored ink of the lower half previously formed. This layer forms the upper half of each of the first clear layer portions 52, the colored layer portions 53, and the second clear layer portions 54 in the layer 5a(n) of FIG. 6. At this occasion also, the ink is cured by using the irradiator 12A close to the nozzle row discharging the clear ink and the colored ink. In this scan for forming the upper half, the recording unit 10 passes over the white layer portions 51, which have been previously formed using the large ink droplets. However, during the passing, no white ink is dropped from the recording unit 10 onto the white layer portions 51.

The layer 5a(n) illustrated in FIG. 6 can be formed by the foregoing process.

Then, to subsequently form the layer 5a(n+1) illustrated in FIG. 6, the recording unit 10 illustrated in FIG. 2 is moved (scan) in the Y axis direction to discharge the large ink droplets of the white ink to form the white layer portions 51, and one layer is thereby formed. At this occasion, the ink is cured using the irradiator 12A close to the white ink nozzle row W in the UV irradiation section 12 illustrated in FIG. 2. Then, at the same time as forming the one layer by discharging the large ink droplets of the white ink for forming the white layer portions 51, another layer is formed by the clear ink and the colored ink in small droplets. The small ink droplets form the lower half of each of the first clear layer portions 52, the colored layer portions 53, and the second clear layer portions 54 in the layer 5a(n+1) of FIG. 6. At this occasion, the ink is cured by using the irradiator 12A close to the nozzle row discharging the clear ink and the colored ink.

Then, the recording unit 10 illustrated in FIG. 2 is moved (scan) in the Y axis direction to form another layer using the clear ink and the colored ink in small droplets on top of the deposited clear ink and colored ink of the lower half previously formed. This layer forms the upper half of each of the first clear layer portions 52, the colored layer portions 53, and the second clear layer portions 54 in the layer 5a(n+1) of FIG. 6. At this occasion also, the ink is cured by using the irradiator 12A close to the nozzle row discharging the clear ink and the colored ink. In this scan for forming the upper half as well, the recording unit 10 passes over the white layer portions 51, which have been previously formed using the large ink droplets. However, during the passing, no white ink is dropped from the recording unit 10 onto the white layer portions 51.

The layer 5a(n+1) is laminated on the layer 5a(n) illustrated in FIG. 6 by the foregoing process.

It should be noted that the shaping ink for forming the shaping layer portions 50 and the support ink for forming the support layer portions 55 not illustrated in FIG. 6 also have the same ink droplet size as the white ink for forming the white layer portions 51.

The above are the processes for the second operation mode of forming the colored portion simultaneously as the shaping of the shaped article. In the second operation mode, the ink resolution of the colored portion can be increased due to the ink droplets for the first clear layer portions 52, the colored layer portions 53, and the second clear layer portions 54 configuring the colored portion being smaller than those for the shaping layer portions 50 and the white layer portions 51 configuring the shaped article, resulting in being able to express the full colors with high precision, and especially there is an advantage that the colors even in half-tones can be satisfactorily exhibited.

It should be noted that as illustrated in FIG. 6, the colored layer portions 53 not only have the colored ink (ink discharged from the yellow ink nozzle row Y, the magenta ink nozzle row M, the cyan ink nozzle row C, and the black ink nozzle row K) deposited, but also have the clear ink discharged from the clear ink nozzle row CL illustrated in FIG. 2 deposited. It should be noted that the clear ink does not necessarily have to be deposited in the colored layer portions 53.

Further, by forming not only the colored layer portions 53 but also the first clear layer portions 52 and the second clear layer portions 54 using the small ink droplets, surface roughness can be reduced, and glossiness can be achieved. This is especially advantageous in formation of the second clear layer 4, which forms the outermost layer of the three-dimensional structure 5.

(2-4) First Operation Mode

In the first operation mode, only the shaping layer portions 50, the white layer portions 51, and the support layer portions 55 of each layer 5a illustrated in FIG. 4 are formed using the ink droplet size of the aforementioned white layer portions 51.

That is, by explaining using a part of FIG. 6, in the first operation mode, one layer is formed by discharging the white ink using the large ink droplets to form the white layer portions 51 of the layer 5a(n). Similarly, the shaping ink for forming the shaping layer portions 50 and the support ink for forming the support layer portions 55 are also discharged with the same ink droplet size as the white ink to form one layer. At this occasion, the ink is cured using the irradiator 12A close to the white ink nozzle row W and the clear ink nozzle row CL in the UV irradiation section 12 illustrated in FIG. 2.

The layer formed by the first operation mode corresponding to the layer 5a(n) in FIG. 6 can be formed by the foregoing process.

Further, the white layer portions 51 (including the shaping layer portions 50) being a part of the layer 5a(n+1) in FIG. 6 is then formed on a part of the layer 5a(n) of FIG. 6 previously formed. At this occasion as well, one layer is formed by discharging the white ink using large ink droplets. Similarly, the shaping ink for forming the shaping layer portions 50 and the support ink for forming the support layer portions 55 are also discharged with the same ink droplet size as the white ink to form one layer. Further, the ink is cured using the irradiators 12A close to the white ink nozzle row W and the support ink nozzle row SP in the UV irradiation section 12 illustrated in FIG. 2.

It should be noted that if the surface of the shaped article does not need to be white and simply needs to be the color of the shaping ink, the white ink does not need to be discharged and only the shaping ink and the support ink may be discharged, and further, if the shaped article does not have any over-hanging portion, only the shaping ink may be discharged.

The laminate structure corresponding to a part of the shaped article in the layers 5a(n) and 5a(n+1) illustrated in FIG. 6 can be formed by the foregoing process.

As above, according to the present embodiment, switching can be made according to the aim between the first operation mode that forms only the shaped article by depositing ink droplets that are larger than the ink droplets used in the formation of the colored portion, and the second operation mode that forms the colored portion together with the shaping of the shaped article. Due to this, if only the shaped article is desired, the first operation mode simply needs to be selected, avoiding the colored portion being formed despite the fact that only the shaped article is being desired, and formation process is given a degree of freedom.

Further, if only the shaped article is desired, large ink droplets may be deposited as aforementioned in the formation, since the color tone does not need to be considered. Due to this, there also is an advantage in that an aimed object (shaped article) can be completed within a relatively shorter period of time.

Moreover, in the first operation mode, since only the first inkjet head nozzle section 11A and the irradiator 12A adjacent thereto need to be operated in the recording unit 10, a scan distance in the Y direction is equal to or less than half the second operation mode, so that the shaping can be performed in a shorter period of time.

Figure 7:
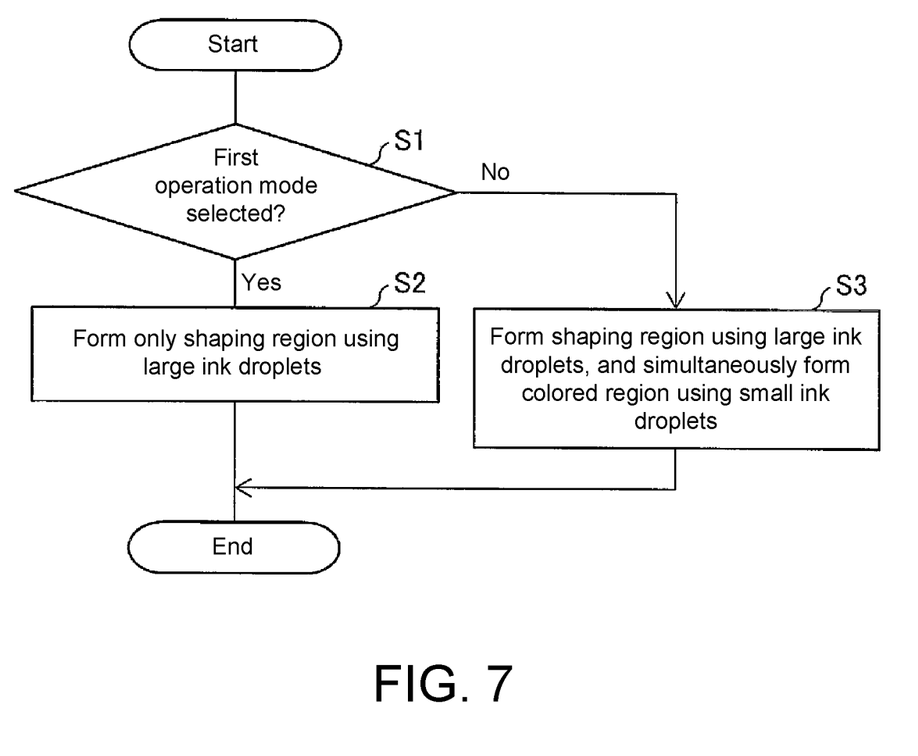
FIG. 7 is a diagram illustrating a control flow of a control unit provided in the forming apparatus illustrated in FIG. 1.

Hereinbelow, a control flow by the control unit 20 will be described using FIG. 7.

When the forming apparatus 30 of the present embodiment is started, the setting section 21 of the control unit 20 generates information indicating whether or not the first operation mode has been selected (by the user) (step S1). This information is output to the first control section 22.

The first control section 22 controls the inkjet head 11 to form the respective layers (shaping region) of the shaped article using the aforementioned large ink droplets by the laminating method if the information acquired from the setting section 21 is information indicating that the first operation mode has been selected (YES in FIG. 7) (step S2). Further, at this occasion, the aforementioned information is acquired as well in the second control section 23 from the setting section 21. Further, the second control section 23 determines which irradiator 12A in the UV irradiation section 12 should radiate, based on the information, and controls the UV irradiation section 12.

On the other hand, if the information acquired from the setting section 21 is information indicating that the first operation mode has not been selected (NO in FIG. 7), the first control section 22 controls the inkjet head 11 to form the colored portion simultaneously as the shaped article under the second operation mode. At this occasion, the inkjet head 11 is controlled so that the shaping region being a part of the shaped article is formed by the aforementioned large ink droplets and the colored region being a part of the colored portion is formed by the aforementioned small ink droplets (step S3). Further, at this occasion, the aforementioned information is acquired as well in the second control section 23 from the setting section 21. Further, the second control section 23 determines which irradiator 12A in the UV irradiation section 12 should radiate, based on the information, and controls the UV irradiation section 12.

It should be noted that the recording unit 10 moves vertically (scans) along the Z axis for each of the formation in plural layer units in either of the operation modes. The plural layer units are in a height range of 100 µm to 2 mm (Z axis direction), and preferably in the height range of 200 µm to 1 mm.

Here, how many layers (two layers in FIG. 6) of the first clear layer portions 52, the colored layer portions 53, and the second clear layer portions 54 configuring the colored portion should be formed for each layer of white layer portions 51 illustrated in FIG. 6 can be preset in the first control section 22.

Further, a thickness of the one layer of white layer portions 51 illustrated in FIG. 6, that is, a thickness of each layer 5a in FIG. 4 (width in the Z axis direction) can be set to 5 µm to 100 µm, and a preferable range thereof is 10 µm to 50 µm.

It should be noted that the control unit 20 may be facilitated by a logical circuit (hardware) formed in an integrated circuit (IC chip) and the like, or may be facilitated by software using a CPU (Central Processing Unit). In the latter case, the control unit 20 includes the CPU for executing instructions of a program being software that realizes the respective functions, a ROM (Read Only Memory) or a memory device in which the program and various types of data are recorded in a computer (or CPU)-readable manner (which are termed "recording medium"), a RAM (Random Access Memory) for loading the program, and the like. Further, the aim of the disclosure is achieved by the computer (or CPU) reading the program from the recording medium and executing the same. As the recording medium, "non-volatile, tangible medium", such as tape, disk, card, semiconductor memory, programmable logical circuit, and the like may be used. Further, the program may be provided to the computer via an arbitrary transmission medium (such as communication network or broadcast waves) that can transmit the program. It should be noted that the disclosure may also be facilitated in a form of data signals embedded in conveying waves, in which the program is configured by electronic transmission.

(3) Other Operation Modes

In the above embodiment, a configuration of switching two operation modes, namely the first operation mode and the second operation mode, is described; however, the disclosure is not limited hereto. For example, an operation mode (third operation mode) for shaping using only the white ink upon shaping only the shaped article may be provided. When this third operation mode is to be facilitated in the recording unit 10 illustrated in FIG. 2, the white ink discharged from the white ink nozzle row W included in the first inkjet head nozzle section 11A is used as the shaping material, and the curing may be performed by the irradiator 12A close to the first inkjet head nozzle section 11A. This third operation mode may be provided in addition to the aforementioned first operation mode and second operation mode, or may replace the first operation mode.

Further, an operation mode (fourth operation mode) for shaping using only the clear ink upon shaping only the shaped article may be provided. When this fourth operation mode is to be facilitated in the recording unit 10 illustrated in FIG. 2, the clear ink discharged from the clear ink nozzle row CL included in the second inkjet head nozzle section 11B is used as the shaping material, and the curing may be performed by the irradiator 12A close to the second inkjet head nozzle section 11B. This fourth operation mode may be provided in addition to the aforementioned first operation mode and second operation mode (and the third operation mode), or may replace the first operation mode (or the third operation mode).

Further, an operation mode (fifth operation mode) of shaping the shaped article with the clear ink, and forming the colored portion using the aforementioned colored ink may be provided. When this fifth operation mode is to be facilitated in the recording unit 10 illustrated in FIG. 2, the clear ink discharged from the clear ink nozzle row CL included in the second inkjet head nozzle section 11B is used as the shaping material, and the curing may be performed by the irradiator 12A close to the second inkjet head nozzle section 11B, the colored ink may be discharged from other nozzle rows Y, M, C, K included in the second inkjet head nozzle section 11B, and they may be cured by the irradiator 12A close to the second inkjet head nozzle section 11B. This fifth operation mode may be provided in addition to the aforementioned first to fourth operation modes, or may replace the second operation mode.

(4) Other Features of Three-Dimensional Structure

In regards to the three-dimensional structure 5, the portions directly related to the characteristic configuration of the disclosure have been described. Now, other features of the three-dimensional structure 5 illustrated in FIGS. 3 and 4 will be described hereinbelow.

Hereinbelow, each of the white layer 1 (white layer portions 51), the first clear layer 2 (first clear layer portions 52), the colored layer 3 (colored layer portions 53), and the second clear layer 4 (second clear layer portions 54) will be described.

White Layer 1 (White Layer Portion 51)

The white layer 1 (white layer portions 51) is a layer having light reflectivity, and at least a surface of the white layer 1 on the colored layer side has light reflectivity capable of reflecting light of all visible range.

The white layer 1 (white layer portions 51) can be formed of ink containing white pigment (white ink). By forming it from the white ink, the light having entered from the surface layer side of the three-dimensional structure 5 through the colored layer 3 can satisfactorily be reflected at the white layer 1, and the colors by the subtractive color mixing can be realized. It should be noted that instead of white, it may be a layer formed of ink having light reflectivity, such as ink containing metal power.

Configuration of First Clear Layer 2 (First Clear Layer Portions 52)

The first clear layer 2 (first clear layer portions 52) is formed of the clear ink.

Here, the clear ink simply needs to be ink that can form a clear layer with 50% or more of light transmittance per unit thickness. When the light transmittance per unit thickness of the clear layer is below 50%, the light transmittance is undesirably inhibited and thus the desired color tone by the subtractive color mixing cannot be exhibited in the shaped article, which is not preferable. Further, preferably the ink having the light transmittance per unit thickness of the clear layer of 80% or more is used, and more preferably the ink having the light transmittance per unit thickness of the clear layer of 90% or more is used.

By arranging the first clear layer 2 (first clear layer portions 52) between the white layer 1 (white layer portions 51) and the colored layer 3 (colored layer portions 53), the colored ink forming the colored layer 3 and the white ink forming the white layer 1 can be prevented from mixing. Even if the colored ink forming the colored layer mixes with the clear ink forming the first clear layer, the colors in the colored layer 3 will not be damaged, and thus no undesirable change would occur in the color tone. Accordingly, a shaped article having the desired color tone (decoration) in the colored layer 3 can be realized.

Colored Layer 3 (Colored Layer Portions 53)

The ink used in the formation of the colored layer 3 (colored layer portions 53) includes colored ink that contains colorants.

As such colored ink, yellow (Y), magenta (M), cyan (C), black (K), and various light-toned color ink are included; however, no limitation is made hereto, and red (R), green (G), blue (B), orange (Or), or the like may be added. Further, metallic, pearled, or fluorescent colors may be used. One or more types of these colored ink may be used to express the desired color tone.

The amount of the colored ink used to form the colored layer 3 (colored layer portions 53) varies depending on the desired (aimed) colored tone. Due to this, for a case of a low-concentrated, light color tone, an ink density of the colored ink by itself would not suffice a predetermined ink density, and there are cases therein where unevenness is formed along the Z directional height, or a dent with no colored ink along X and Y directions is formed. In all of such cases, an undesirable dents and bumps would occur in the shaped article formed by the lamination method as in the present embodiment, which is not preferable. Especially, in a vertical shaping surface near a center of the laminate structure illustrated in FIG. 6, in the ink formation using error diffusion, the number of the colored ink becomes four droplets at maximum (maximum density) and zero at minimum (zero density, meaning white) for a case where one cross section of the colored layer 3 equals a total of four droplet ink density, two ink droplets vertically and horizontally each, and thus a space equaling a gap of four droplets may be formed for the minimum case, which deteriorates the quality from both the aspect of shaping and from the aspect of color tones.

Thus, in the present embodiment, for portions where the ink density of the colored layer 3 (colored layer portions 53) would not suffice the predetermined ink density by the sole use of the colored ink, the ink density of the colored layer 3 (colored layer portions 53) is supplemented by supplemental ink. That is, the colored layer 3 (colored layer portions 53) is formed so that a total density (number of ink droplets) of the colored ink and the supplemental ink becomes constant. Due to this, the generation of the aforementioned recess can be avoided, and the shape of the three-dimensional structure 5 can accurately be shaped.

Since the discharge amount of the colored ink and the striking positions of the respective colors of ink configured by the colored ink are known in advance, a supplementing amount and supplementing positions (striking positions) of the supplemental ink can be determined by taking the aforementioned factors into consideration. This determination may be performed in the inkjet head apparatus, the control unit 20 (FIG. 1), or another control means.

Further, by supplementing the ink density by the supplemental ink, the surface formed in the colored layer 3 becomes flat, so that the glossiness can be achieved.

The supplemental ink simply needs to be ink that does not give any undesirable influence to the color tone to be expressed in the colored layer 3 (colored layer portions 53), and as an example, the clear ink used in the first clear layer 2 (first clear layer portions 52) and the second clear layer 4 (first clear layer portions 54) may be employed.

It should be noted that in the present embodiment, the explanation is given based on the colored layer 3; however, the disclosure is not limited to the colored layer, and there is no limitation so long as it is a decorative layer.

Configuration of Second Clear Layer 4 (Second Clear Layer Portions 54)

The second clear layer 4 (second clear layer portions 54) is formed by using the clear ink described in the first clear layer 2 (first clear layer portions 52). It should be noted that the second clear layer 4 and the first clear layer 2 may be formed using the same type of clear ink, or may be formed by different types of clear ink.

The second clear layer 4 not only has the function as the protection layer of the colored layer 3, but also has an advantageous effect of enabling the precise manufacture of the three-dimensional structure 5 in the disclosure (in the present embodiment) employing the lamination method. That is, if the colored layer 3 configures the outermost layer of the three-dimensional structure 5, in other words, in a case where the colored layer portions 53 are positioned on the farthest ends in the layers 5a having the colored layer portions 53, there is a risk that the colored layer 3 (colored layer portions 53) cannot be formed precisely. However, as in the present embodiment, by having the second clear layer 4 (second clear layer portions 54) provided on the outermost layer of the three-dimensional structure 5, the colored layer 3 (colored layer portions 53) can be formed precisely, and thus the second clear layer 4 (second clear layer portions 54) can contribute to the expression of the desired color tone.

Further, if the colored layer 3 configures the outermost layer of the three-dimensional structure 5, the colored layer 3 is exposed, meaning that decoloration by friction and discoloration by ultraviolet light are more likely to occur. However, by having the second clear layer 4 (second clear layer portions 54) provided on the outermost layer of the three-dimensional structure 5 as in the present embodiment, such decoloration and discoloration can be prevented.

SUPPLEMENTAL INFORMATION

A forming apparatus 30 according to an embodiment of the disclosure is a three-dimensional structure forming apparatus for forming a three-dimensional structure by laminating layers, the three-dimensional structure including a shaped article and a colored portion that colors a surface of the shaped article, the forming apparatus including: a first operation mode dedicated to shaping a shaped article; a second operation mode of coloring the surface of the shaped article using full colors according to input data simultaneously as the shaping of the shaped article; and a control unit 20 configured to switch between the first operation mode and the second operation mode.

According to this configuration, by being provided with the control unit 20, the operation modes can be switched between a case where a user desires to perform only the shaping and a case where a three-dimensional structure further having the surface of its shaped article colored is desired.

Further, for example, in a case where an ink resolution to be used in the full-colored coloring in the second operation mode as above is relatively small (fine), in the first operation mode in which the shaping simply needs to be performed without giving any consideration to color tones, the shaping can be performed using the ink resolution larger than the ink resolution used in the full-colored coloring. In this case, an effect can be achieved in that the shaped article can rapidly be formed when the first operation mode is selected.

Further, in addition to the above configuration, a forming apparatus 30 according to an embodiment of the disclosure may further include an inkjet head 11, where the layers formed by discharging a shaping material for the shaping and a coloring material for the coloring from the inkjet head 11 are laminated.

Further, in addition to the above configuration, in a forming apparatus 30 according to an embodiment of the disclosure, scanning for forming a plurality of the colored layers may be performed within a scan cycle time period for forming one layer in the shaping.

According to this configuration, the ink resolution of the fully-colored portion becomes finer than the molded portion where the color tones do not have to be considered. Due to this, the colors in half-tones can satisfactorily be exhibited in the fully-colored portion.

Further, in addition to the above configuration, in a forming apparatus 30 according to an embodiment of the disclosure, scanning for forming plural clear protection layers may be performed within a scan cycle time period for forming one layer in the shaping.

According to this configuration, a surface roughness of the clear protection layers can be reduced, and glossiness can be achieved.

Further, in addition to the above configuration, in a forming apparatus 30 according to an embodiment of the disclosure, ultraviolet curing ink is used as the shaping material and the coloring material.

According to this configuration, since by using the ultraviolet curing ink as the shaping material and the coloring material, the ink can be cured within a short period of time, the lamination thereof is easy, and the aimed object (shaped article, three-dimensional structure) can be formed with a shorter period of time.

Further, a forming apparatus 30 according to an embodiment of the disclosure may further include, in addition to the aforementioned configuration: a first inkjet head nozzle section 11A configured to discharge the shaping material; a second inkjet head nozzle section 11B configured to discharge the coloring material; and a plurality of irradiators 12A including light sources for curing the ink, where the plurality of irradiators 12A is respectively arranged at positions with each of the first inkjet head nozzle section 11A and the second inkjet head nozzle section 11B interposed in between along a scanning direction.

According to this configuration, since an irradiation section is provided at each of the positions having the first inkjet head nozzle section 11A and the second inkjet head nozzle section 11B interposed in between along the scanning direction, the ink that has been dropped can efficiently be cured.

The disclosure is not limited to any of the aforementioned embodiments, and various modifications can be made within the scope indicated in the claims, and embodiments acquired by suitably combining the technical matters disclosed in different embodiments are also included within the technical scope of the disclosure.

INDUSTRIAL APPLICABILITY

The disclosure can be adapted to any type of forming apparatuses for forming a three-dimensional structure.

The invention claimed is:

1. A three-dimensional structure forming apparatus adapted for forming a three-dimensional structure by laminating layers with ink, the three-dimensional structure including a shaped article and a colored portion that colors a surface of the shaped article, the three-dimensional structure forming apparatus comprising:
a recording device that performs laminating by discharging the ink while scanning in a main scanning direction, wherein the recording device comprises:
a first nozzle row group including a shaping nozzle row that discharges a plurality of different shaping inks for shaping the shaped article, and the plurality of different shaping inks are non-coloring ink; and
a second nozzle row group including a plurality of coloring nozzle rows that discharge a plurality of different coloring inks for forming the colored portion,
wherein the first nozzle row group and the second nozzle row group are disposed in different positions in the main scanning direction, and the first nozzle row group and the second nozzle row group are disposed in a same position in a sub-scanning direction which is a direction orthogonal to the main scanning direction in a horizontal direction,
the three-dimensional structure forming apparatus further comprising:
a controller configured to control a discharge of the ink of the shaping nozzle row and the coloring nozzle row and a movement of the recording device in the main scanning direction, wherein
the controller comprises a first control section, a second control section and a switching section, wherein the first control section is configured to control a first operation mode, the second control section is configured to control a second operation mode, and the switching section is configured to switch between the first operation mode and the second operation mode,
wherein the shaping is performed by merely using the shaping nozzle row based on a shape data in the first operation mode, and the shaping in which a colored region is formed on the surface of the shaped article is performed by using the plurality of different shaping inks discharged by the shaping nozzle row and the plurality of different coloring inks discharged by the coloring nozzle row in the second operation mode, and
the controller controls to perform the shaping by merely using the first nozzle row group in the first operation mode.

2. The three-dimensional structure forming apparatus according to claim 1, wherein the shaping ink for shaping the shaped article and the coloring ink for forming the colored portion are photo curable ink, and the recording device further comprises a curing light source for curing the photo curable ink.

3. The three-dimensional structure forming apparatus according to claim 2, wherein the curing light source is disposed as sandwiched between the first nozzle row group and the second nozzle row group in the main scanning direction.

4. The three-dimensional structure forming apparatus according to claim 2, wherein the curing light source is configured to include a plurality of curing light sources having different irradiation intensity disposed in the main scanning direction.

5. The three-dimensional structure forming apparatus according to claim 1, wherein the first nozzle row group further comprises a support ink nozzle row for discharging a support material ink that supports the three-dimensional structure during shaping.

6. The three-dimensional structure forming apparatus according to claim 1, wherein the first nozzle row group further comprises a white ink nozzle row for discharging a white ink.

7. The three-dimensional structure forming apparatus according to claim 1, wherein the second nozzle row group further comprises a clear ink nozzle row that for discharging a clear ink.

* * * * *